US010028105B1

(12) United States Patent
Swart

(10) Patent No.: US 10,028,105 B1
(45) Date of Patent: Jul. 17, 2018

(54) BLUETOOTH LOW ENERGY (BLE) REAL-TIME LOCATION SYSTEM (RTLS) HAVING TAGS THAT HARVEST ENERGY, BRIDGES THAT INSTRUCT TAGS TO TOGGLE BEACON MODES ON AND OFF, BEACONS AND BRIDGES THAT SELF-REPORT LOCATION CHANGES, AND OPTIONAL USE OF A SINGLE BEACON CHANNEL

(71) Applicant: Infinite Leap, Inc., Fargo, ND (US)

(72) Inventor: John A. Swart, Grand Rapids, MI (US)

(73) Assignee: Infinite Leap, Inc., Fargo, ND (US)

( * ) Notice: Subject to any disclaimer, the term of this patent is extended or adjusted under 35 U.S.C. 154(b) by 0 days.

(21) Appl. No.: 15/610,072

(22) Filed: May 31, 2017

Related U.S. Application Data

(60) Provisional application No. 62/430,559, filed on Dec. 6, 2016, provisional application No. 62/343,242, filed on May 31, 2016.

(51) Int. Cl.
*H04W 24/00* (2009.01)
*H04W 4/04* (2009.01)
*H04W 4/00* (2018.01)
*G01S 1/68* (2006.01)
*G01S 5/00* (2006.01)
*G01S 5/14* (2006.01)
*H04W 4/80* (2018.01)

(52) U.S. Cl.
CPC .............. *H04W 4/043* (2013.01); *G01S 1/68* (2013.01); *G01S 5/0027* (2013.01); *G01S 5/14* (2013.01); *H04W 4/008* (2013.01); *H04W 4/80* (2018.02)

(58) Field of Classification Search
CPC ....... H04W 64/00; H04W 4/02; H04W 8/245; H04W 88/02; H04L 29/08657; G06K 7/0008; G06K 19/0723
USPC ........ 455/456.2, 456.5, 418, 422.1; 340/10.3
See application file for complete search history.

(56) References Cited

U.S. PATENT DOCUMENTS

| | | | |
|---|---|---|---|
| 9,810,767 B1* | 11/2017 | Hamilton | G01S 5/14 |
| 2007/0046434 A1* | 3/2007 | Chakraborty | G06K 7/0008 |
| | | | 340/10.1 |
| 2007/0247366 A1* | 10/2007 | Smith | G01S 5/021 |
| | | | 342/464 |
| 2011/0072132 A1* | 3/2011 | Shafer | G06Q 10/087 |
| | | | 709/224 |

(Continued)

Primary Examiner — Danh Le
(74) Attorney, Agent, or Firm — Frank M. Scutch, III

(57) ABSTRACT

A real-time locating system (RTLS) for use in tracking assets and people includes tag, beacon and bridge components, where the tag contains a Bluetooth low energy (BLE) transceiver and a microprocessor for operating the transceiver. The tag is powered by a battery that depletes. A photocell is connected to an energy storage device. A capacitor is connected to the energy storage device such that the photocell charges the energy storage device so the capacitor can power the microprocessor and BLE transceiver for performing limited tasks upon battery depletion. The tag also includes a speaker for providing an audible sound to locate an out-of-sight tag and an accelerometer for detecting tag movement. The bridge is able to temporarily toggle each tag into a connectable-advertising state for connection to a smart device. The beacon and bridge are able to self-report location changes estimated with the use of onboard filters.

20 Claims, 9 Drawing Sheets

(56) References Cited

U.S. PATENT DOCUMENTS

| | | | |
|---|---|---|---|
| 2011/0080267 A1* | 4/2011 | Clare | G01S 13/82 |
| | | | 340/10.4 |
| 2013/0141233 A1* | 6/2013 | Jacobs | G08B 19/00 |
| | | | 340/521 |
| 2013/0201003 A1* | 8/2013 | Sabesan | G01S 7/42 |
| | | | 340/10.1 |
| 2014/0351498 A1* | 11/2014 | Hsueh | G06F 12/0866 |
| | | | 711/103 |
| 2015/0063472 A1* | 3/2015 | Chatterton | H04L 63/0492 |
| | | | 375/256 |
| 2016/0029160 A1* | 1/2016 | Theurer | G06F 19/327 |
| | | | 455/456.1 |
| 2016/0295358 A1* | 10/2016 | Cariss | H04W 4/04 |
| 2016/0295376 A1 | 10/2016 | Geng et al. | |
| 2017/0142549 A1* | 5/2017 | Herbert | H04W 4/021 |
| 2017/0313426 A1* | 11/2017 | Morin | B64D 11/0015 |

\* cited by examiner

BLUETOOTH LOW ENERGY (BLE) REAL-TIME LOCATION SYSTEM (RTLS) HAVING TAGS THAT HARVEST ENERGY, BRIDGES THAT INSTRUCT TAGS TO TOGGLE BEACON MODES ON AND OFF, BEACONS AND BRIDGES THAT SELF-REPORT LOCATION CHANGES, AND OPTIONAL USE OF A SINGLE BEACON CHANNEL

FIELD OF THE INVENTION

The present invention relates generally to a real-time location system (RTLS) and more particularly to a Bluetooth Low Energy (BLE) RTLS having active tags that harvest energy to report when their battery is dead, bridges that instruct tags to temporarily toggle into and out of beacon mode to aid speed of location, beacons and bridges that self-report location changes, and optional use of a single beacon channel.

BACKGROUND

Real-time location systems (RTLS) are technology solutions that automatically identify and track the location of objects or people in real time, in most cases within a building such as a hospital, warehouse, shipping yard, or campus.

In a typical implementation, wireless RTLS tags are affixed to objects or worn by people, and fixed reference points receive wireless signals from these tags to determine their location. Tags and fixed reference points can be transmitters, receivers or both, and this flexibility allows for multiple possible combinations. These solutions enable organizations to more effectively keep track of where things are, which can help them improve processes they are currently struggling with, such as inventory management.

RTLS systems are designed to replace outdated, less efficient solutions such as spreadsheets and clipboards, by automating tasks that are now largely manual and prone to errors. The RTLS systems are also valuable to businesses because they generate intelligence: Useful data about product and asset movement within facilities, how quickly processes are being completed, and what organizations such as hospitals can do to speed up services. Data gathered by these systems can be stored, analyzed, audited, and assessed by internal parties or external authorities such as public safety organizations.

The term "RTLS" first emerged in the late 1990s, to describe and differentiate a new technology that leveraged the automatic identification capabilities of radio frequency identification (RFID) tags, and provided the ability to view the location of a tagged object on a computer screen. Although similar capabilities had been used earlier by military and government agencies, the technology supporting it had been too costly for commercial purposes. Today, RTLS is dynamic market and according to many estimates growing over 30% annually. One of the key factors contributing to this market growth is the increasing adoption of RTLS in the healthcare industry. For example, some systems use passive RFID tags to track the location of objects. With passive RFID, a reader and antenna send a radio signal to a tag, which uses the transmitted signal to power itself. Passive RFID systems can operate in low frequency (LF), high frequency (HF) or ultra-high frequency (UHF) radio bands.

Applications of RTLS typically aim to improve operational processes and workflows; safety and security; inventory management, or a combination of all of these. RTLS solution implementation can help organizations address specific challenges they are facing related to a range of causes including resource inefficiencies and even employee endangerment. Factory workers can use RTLS to find and deliver needed materials to keep production processes running smoothly, enhancing productivity through significant time savings.

In the healthcare sector, hospitals and clinics can use the technology to track and manage assets such as medical equipment, through real-time visibility into the location and status of the equipment. This can potentially reduce inventory costs, cut down on the time it takes nurses, technicians and other healthcare professionals to locate missing equipment, reduce theft of high-cost systems, and automate the maintenance of equipment. Healthcare facilities can also decrease the amount of time patients have to wait between procedures, through automated alerting and monitoring of patient activity or inactivity. They can also enhance the safety of patients by keeping track of their whereabouts within a facility. One of the unique attributes of RTLS that makes it applicable to so many applications and industries is its ability to track the location of so many different types of assets, whether it's equipment, tools, shipping containers, measurement devices or vehicles. Knowing the exact location and condition of assets can help companies improve workflow processes—regardless of the type of business they provide.

RTLS is also valuable because it can be used to track people. For industries such as healthcare, the benefits of this are clear: hospital administrators can follow a patient's journey through the emergency room, admission process, operating room, and hospital room—all the way through discharge. Tracking such metrics as wait times during these various stages in the patients' journey helps administrators to better address potential patient flow challenges. People-tracking using RTLS can also be used to improve safety. Through the use of security badges, people who work in harsh environmental conditions and remote processing plants can be tracked in case of emergencies. The technology can not only track the location of objects but their condition as well, through such capabilities as remote temperature and humidity monitoring. Industries that rely on products or materials being managed in optimal conditions, such as healthcare, food processing, pharmaceuticals, chemicals, etc., can benefit from ensuring that these products are stored and kept in the best possible conditions. The potential benefits include cost savings and, even more important, public safety.

One of the common threads with all of these RTLS applications is the alarm/alert capabilities of the system. Whether it is to indicate that an asset is located in the wrong place at the wrong time, that a worker is in some kind of danger, that a patient requires help, or that a freezer has reached a high temperature threshold, RTLS can send an immediate signal to a manager, nurse, public safety official, or other user that allows them to take quick action. This type of alerting capability can be used in a multitude of ways to provide benefits in a variety of industries, including financial services, retail, public safety, healthcare, pharmaceuticals, education, transportation, energy, and manufacturing.

RTLS configurations can vary significantly depending on what type of facilities the technology is being used in, the type of system, how it is being used, what types of products are being tracked, what conditions are being monitored, etc. A key piece of the RTLS configuration is the badge or "tag" that is used to provide location information. Tags are attached to whatever assets, equipment, or materials an organization wants to track, while badges are worn by people who can be tracked or who use the system to trigger alerts. These lightweight tags or badges transmit radio frequency signals periodically to access points, and subsequently to RTLS software. A single implementation can support as many as thousands of tags, but most deployments start much smaller and can be scaled up as needed. The accuracy of tag locations can be enhanced by the use of small, battery powered location beacons that can be strategically installed within facilities such as distribution warehouse corridors, hospital rooms, logistics yards, ports, or other facility areas. These products operate wirelessly.

Finally, a wireless access point (AP) or "bridge" is a device that enables wireless devices to connect to a network using Wi-Fi or related standards.

SUMMARY OF THE INVENTION

An RTLS system having tags, beacons, bridges, and a central server for providing asset- and patient-tag location and management. Beacons provide a location reference by transmitting BLE advertising messages. The system's tags listen for advertising messages from beacons, and report with low energy Bluetooth (BLE) messaging through a bridge to a server at a central location. The information that bridges report to the central server includes BOTH characteristics of BLE beacon advertising messages, sent from one or more BLE infrastructure beacons and received at the moving tag (for clarity, defined as "information set 1"), and characteristics of BLE location-update messages, sent from a moving tag and received at one or more infrastructure bridges ("information set 2"). The central server contains a location engine which uses both "information set 1" and "information set 2" to estimate the location of the moving tag. The system includes a tag-finder mode where a smart device can use BLE messaging to instruct a tag to beep. The bridge is periodically updated with information from a central server to determine tag-finder-mode changes. Tags are periodically instructed from a bridge to toggle into a tag-finder mode, so the tags can be found more quickly than with the prior art, and toggle out of tag-finder mode so the tags can save battery. Tags, beacons and bridges all use on-board processors running Kalman filters to estimate location based on current and past signal-strength readings, and report location changes when the filter suggests a new most-likely location.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
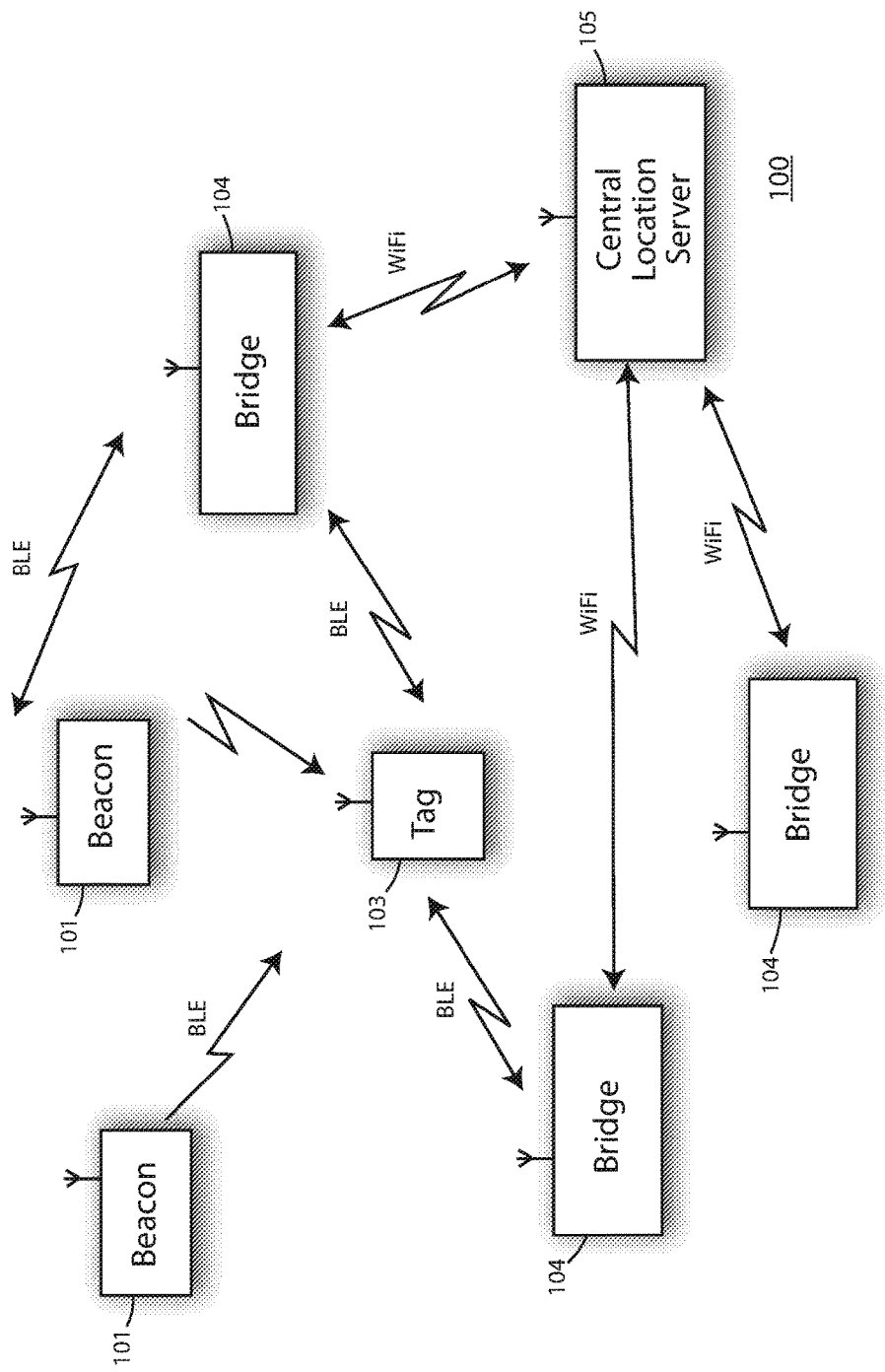
FIG. 1 a block diagram illustrating components in an RTLS in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an RTLS having tags that harvest energy for operation when their battery is dead, bridges that can instruct a tag to temporarily enter a connectable beacon mode for a battery-efficient tag-finder operation, tags, beacons and bridges that self-report any location changes using on-board Kalman filters, and optional beacon transmission on a single channel. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of RTLS having energy-harvesting tags, bridges with mode-instruction, and tags, bridges and beacons that self-report location changes. The non-processor circuits may include, but are not limited to, a radio receiver, a radio transmitter, signal drivers, clock circuits, power source circuits, and user input devices. As such, these functions may be interpreted as steps of a method to perform energy-harvesting tags, bridges with mode-instruction, and tags, bridges and beacons that self-report location changes. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 a block diagram illustrating components used in the BLE RTLS in accordance with various embodiments of the invention. The system 100 includes one or more beacon transmitters 101 that operate using a BLE signal transmission on one to three channels to one or more tags 103 placed on/with various moveable people and assets around a location such as a hospital. As will be described herein, when the tag receives the beaconing signal from the beacon 101, it will process the received signal(s) with a Kalman filter, and transmit either when the estimated location of the tag has changed or no beacon signal has been received for some predetermined time period. The tag 103 transmits this change to one or more bridges 104 via BLE where the location information and other updated data is retransmitted by the bridges via Wi-Fi to a central location server 105. As is already typical in the industry, the central location server may employ trilateration algorithms on the signal strength reports it receives from multiple bridges (previously defined in the Summary of the Invention as "information set 2"), to form one estimate of the location of the tag. The central location server 105 also processes the content of the bridges' location update messages, which contains more information about the tag's location, specifically information about the received signal strengths of beacons that the tag can hear (previously defined in the Summary of the Invention as "information set 1"). All of this information, including signal strengths of beacon transmissions heard at the tag, and signal strengths of tag transmissions heard at bridges, is factored into the location algorithm at the central location server.

Thus, the system in FIG. 1 includes a novel feature not taught in the prior art namely; 1) a system of beacons, tags, bridges AND a location engine, which enables the location engine to combine two location estimates: one trilaterated location estimate, and a second location estimate provided by the tag which is based on one or more BLE beacons it has heard; to produce a combined location estimate, used to store a updated, estimated location of the tag.

Figure 2:
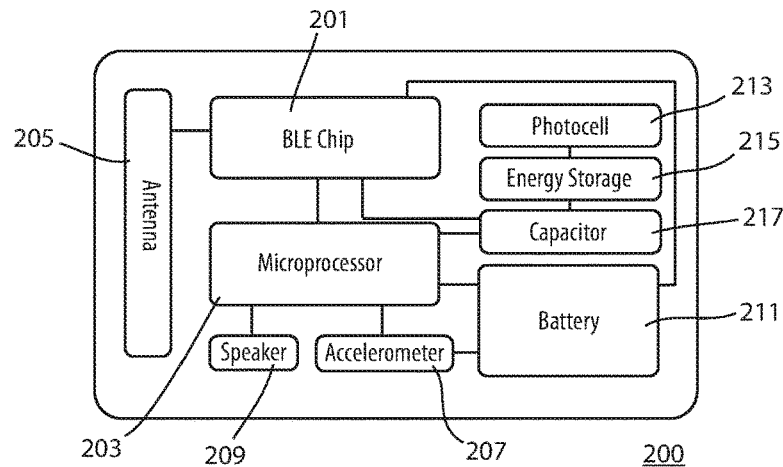
FIG. 2 is a block diagram illustrating components used in the tag.

FIG. 2 is a block diagram illustrating system components used in the tag as seen in FIG. 1. The tag 200 includes a low energy BLE transceiver 201 that works to transmit and receive Bluetooth RF signals. The BLE transceiver 201 is connected to a microprocessor 203 for controlling the operation of the transceiver. The BLE transceiver is also connected to an antenna for providing communication to other devices. The tag further includes an accelerometer 207 connected to microprocessor 203 for detecting motion of the tag and a speaker 209 for providing audible tones or other indicia for use in locating a misplaced or out-of-sight tag. The tag 200 further includes a unique power management system where a battery 211 is connected to the microprocessor 203 and accelerometer 207 where the battery 211 works to power these devices. In the event the battery is below some predetermined threshold and/or is dead or spent, a photocell 213 using light energy can be used to power the device for specific tasks. More specifically, the photocell 213 connects to an energy storage device 215 that works to charge the storage device 215 for use in tasks requiring short bursts of energy to power the tag 100. The energy storage 215 then charges a capacitor 217, connected to the BLE transceiver 201 and microprocessor 203, for energizing these devices for such limited periods of time e.g. when the tag is misplaced and has a dead battery.

Thus, the tag 200 includes a number of novel features not taught in the prior art namely; 1) the tag 200 is rarely spent nor will it ever be fully discharged since it will not die due to battery depletion. The photocell 213 and energy storage 215 are used to charge the battery to a level where sufficient energy can be harvested for operating the tag for limited periods. Using this technique, when the battery is depleted, the photocell charges the energy storage device 215 for operating the tag 200 for limited tasks including running an initialization process, executing software in the tag, estimating and reporting tag location; 2) the tag 200 also includes a speaker 209 that operates in combination with a bridge (which can toggle the tag into and out of connectable advertising mode) and an app on a smart device, such as a cellular phone, tablet, laptop or the like, to provide a sound such as a beep, tone or other annunciated message for quickly locating a lost or out-of-sight tag; 3) a tag 200 can offer a location hint by calculating and reporting a "confidence" metric based on its estimated location fix. The confidence metric is based on relative signal strength (RSSI) measurements and can also offer suggestions to the operator for locating the tag such as "check adjacent room" etc.; 4) the tag-based microprocessor execution of a Kalman filter to estimate location through a maximum likelihood calculation that takes into account prior readings of signal strength, current readings of signal strength, accelerometer status, probabilities of missed beacon readings, and fast fading characteristics of the environment, and transmits only when this Kalman filter determines a high-enough probability of location change to justify the tag-energy expenditure; and 5) the accelerometer 207 status used as an input to the Kalman filter in the filter's determination of probability of a location change.

Those skilled in the art will recognize that the accelerometer has been used in the past as an energy conservation tool, reducing the number of location readings when the tag is not moving. What is not shown in the prior art is the tag 200, while doing a scheduled location reading during a period of no motion, will factor the accelerometer state into the Kalman-filter decision of whether to transmit a location update. Imagine a case where the tag believes it is most likely in location 1, and a subsequent location (beacon) reading process suggests that location 2's beacon is strongest. If the accelerometer shows no movement, the tag may decide that it is most likely that the environmental fast fading has caused a temporary fade in a beacon from location 1, that the tag is most likely still in location 1, and not transmit a location update. But given the exact same beacon signal-strength readings and an accelerometer state showing motion, the tag may decide that it has mostly likely moved to location 2 and send a location update.

Those skilled in the art will recognize that Kalman filtering, also known as linear quadratic estimation (LQE), is an algorithm that uses a series of measurements observed over time, containing statistical noise and other inaccuracies, and produces estimates of unknown variables that tend to be more precise than those based on a single measurement alone, by using Bayesian inference and estimating a joint probability distribution over the variables for each timeframe. The Kalman filter algorithm works in a two-step process. Initially, in a prediction step, the Kalman filter produces estimates of the current state variables, along with their uncertainties. Once the outcome of the next measurement (necessarily corrupted with some amount of error, including random noise) is observed, these estimates are updated using a weighted average, with more weight being given to estimates with higher certainty. The algorithm is recursive. It can run in real time, using only the present input measurements and the previously calculated state and its uncertainty matrix; no additional past information is required.

Further, the Kalman filter does not require any assumption that the errors are Gaussian. However, the filter yields the exact conditional probability estimate in the special case that all errors are Gaussian-distributed. Extensions and generalizations to the method have also been developed, such as the extended Kalman filter and the unscented Kalman filter which work on nonlinear systems. The underlying model is a Bayesian model similar to a hidden Markov model but where the state space of the latent variables is continuous and where all latent and observed variables have Gaussian distributions. Those skilled in the art will recognize that a Kalman filter is common in the central server, but the novel invention is the use of a Kalman filter on-board, embedded in the tag, beacon and bridge.

Figure 3:
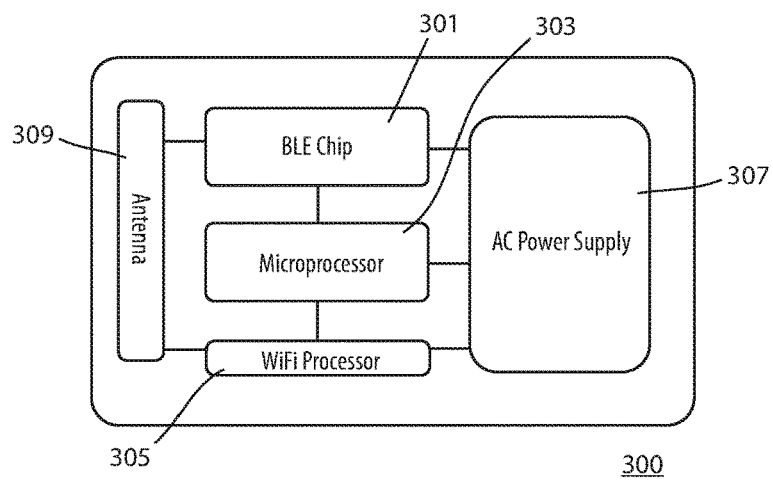
FIG. 3. is a block diagram illustrating components used in the bridge.

FIG. 3. is a block diagram illustrating components used in the bridge as seen in FIG. 1. The bridge 300 includes one or more BLE transceivers 301 that connect to a microprocessor 303 for controlling operation of the transceiver(s). A Wi-Fi processor 305 also connects to the processor for transmitting and receiving Wi-Fi signals. An AC power supply is connected to the BLE transceiver 301, microprocessor 303 and the Wi-Fi processor 305 for powering these devices. The AC power supply includes components for retention of some energy even after being unplugged for some time period. An antenna 309 is connected to both the BLE transceiver 301 and the Wi-Fi processor 305 for transmitting and receiving BLE and Wi-Fi RF signals to these devices at the appropriate frequency.

Thus, a bridge 104 includes many unique features not taught in the prior art namely; 1) the ability to toggle a tag 103 from an intermittent listening mode into a connectable advertising mode, upon instruction from a central server 105. If someone needs to find a tag 103 in a difficult-to-see location, they may request the server to put the tag into a "tag finder" mode. The server 105 instructs the bridge(s) 104 through a query process or broadcast process, to put the tag ID onto a "tag finder mode" list. Tags 103 periodically query the bridge 104 to see if they are on the "tag-finder" list. If on the list, they may immediately sound, and they are toggled into a connectable advertising mode; from that mode, they may connect to a smart device using standard BLE protocols, and the smart device may instruct the tag to audibly sound; and 2) when a bridge 104 loses AC power, it stores some energy for executing a periodic maintenance/locating/reporting process, running a Kalman filter process similar to the process already described for the tag 103, so the bridge can report to the central server its location even after being unplugged or unpowered.

Figure 4:
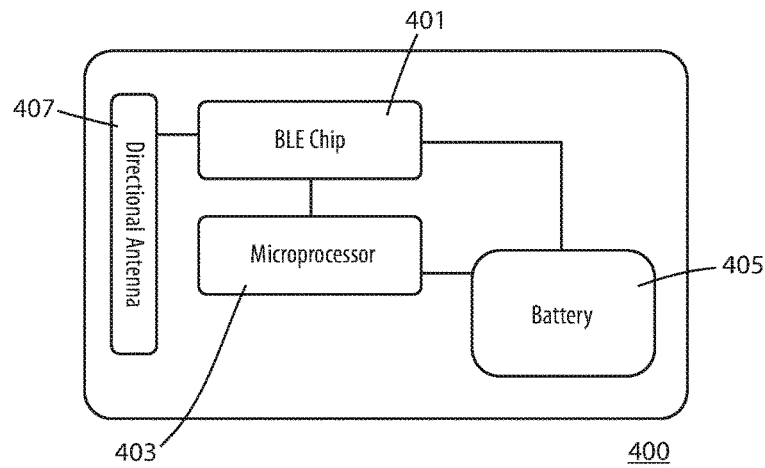
FIG. 4 is a block diagram illustrating components used in the beacon.

FIG. 4 is a block diagram illustrating components used in the beacon as shown in FIG. 1. The beacon 400 includes components for transmitting BLE advertisements and includes one or more BLE transceivers 401 that connect to a microprocessor 403 for controlling the transceiver(s). A battery 405 connects to the BLE transceiver(s) 401 and the microprocessor 403 for powering these devices. As described herein, the beacon 400 typically is placed in the ceiling of a room so that tags can easily receive the beacon signal from the BLE transceiver 401 when the tags are moved between locations between rooms. The beacon 400 includes one or more antennas 407 for redundant transmission of signals to tags, to mitigate multipath fading between the tag and an antenna. The antenna(s) may direct and/or target the RF energy from the BLE transceiver 401 to specific areas of a building or room to limit the RF energy from traveling between walls or floors of the building, so tags receive a strong signal from the beacons on their floor, but weaker signals from beacons on other floors.

Thus, a beacon 400 also includes many unique features not taught in the prior art namely; 1) typical beacons used in RTLS transmit on all three advertising channels while the beacon 400 includes a long life beacon mode for transmitting on only one advertising channel for conserving energy; 2) the software associated with the beacon 400 allows each floor to be assigned a different advertising channel so to distinctly identify the floor where assets are located; 3) the beacon periodically executes a listening function, similar to the function used with a tag, thereby enabling the beacon to estimate location based on a Kalman filter, and self-report location changes, such as a beacon falling from the ceiling or being removed from its intended location, and 4) the beacon also includes one or more directional antennas for transmitting and receiving RF energy with spatial redundancy to the tag, and also to a specific direction or area. This insures that the room and floor fix are accurate, mitigating for "floor hops" when BLE RF energy may travel between floors.

Figure 5:
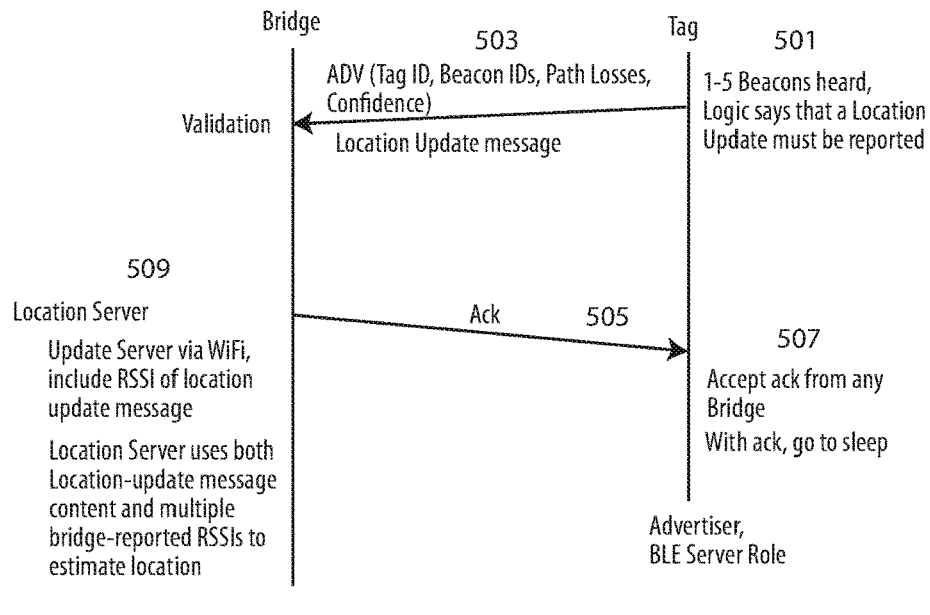
FIG. 5 is a diagram illustrating steps used in updating a tag location without a connection.

FIG. 5 is a diagram illustrating steps used in updating a tag location. When the tag receives a signal from one or more beacons, the software used in the tag will update and report the Kalman-filter-calculated probable tag location based on the beacon signals received, past signals received, accelerometer status, and/or fast fading characteristics of the environment. To save energy, the update may be sent only if the Kalman filter determines a high probability of a location change, based on the execution of the location algorithm that processes the received signals 501. The tag then transmits tag data comprised of the tag ID, probable location/beacon ID(s), path loss(es), accelerometer status, and/or confidence metrics 503. Once validated, the bridge then transmits an acknowledgment signal 505 to the tag where the tag will accept an acknowledgment from any bridge if within range.

With the acknowledgment, the tag will go to sleep 507. Thereafter, the bridge will transmit this update to the location server via Wi-Fi 509.

Figure 6:
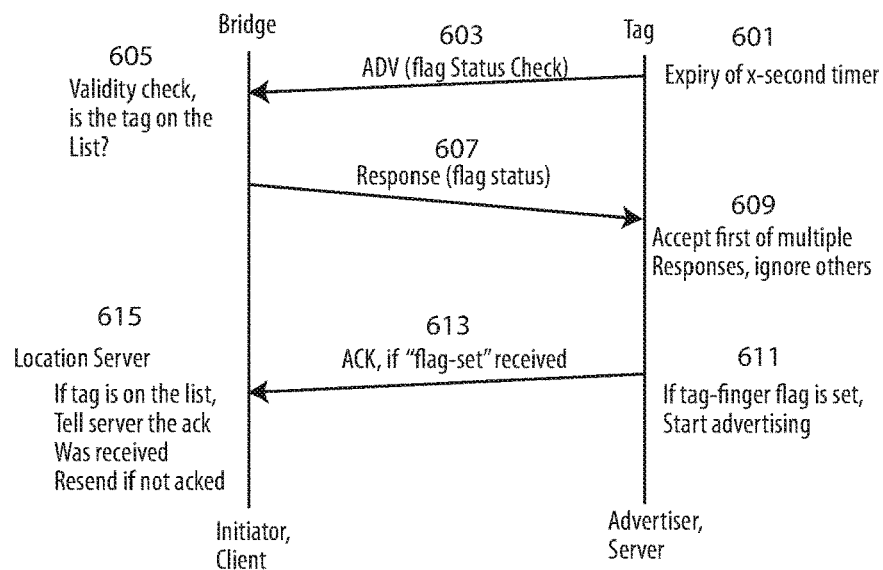
FIG. 6 is a diagram illustrating steps used in providing a tag-finder flag without bridge connection.

FIG. 6 is a diagram illustrating steps used by a bridge to toggle a tag into a BLE-connectable beaconing mode, to set up a tag-finder process. The process 600 begins where a timer on the tag, set to some predetermined time, reaches expiration 601. The tag then transmits a flag status check 603 to the bridge which performs a validity check to determine if the tag is presently recognized on a list of valid tags 605. The bridge then transmits a response, such as flag status 607, to the tag. The tag then accepts the first of multiple responses and ignores others 609. If the tag finder flag is set, the tag may generate a sound, and will start BLE-connectable advertising 611 and transmitting an acknowledgment that the "flag set" instruction has been received 613. The bridge will then transmit to the location server, indicating to the server the acknowledgement was received. With the tag in connectable advertising mode, it may connect to an app on a smart BLE device and receive instructions from the smart device to generate an audible signal.

Figure 7:
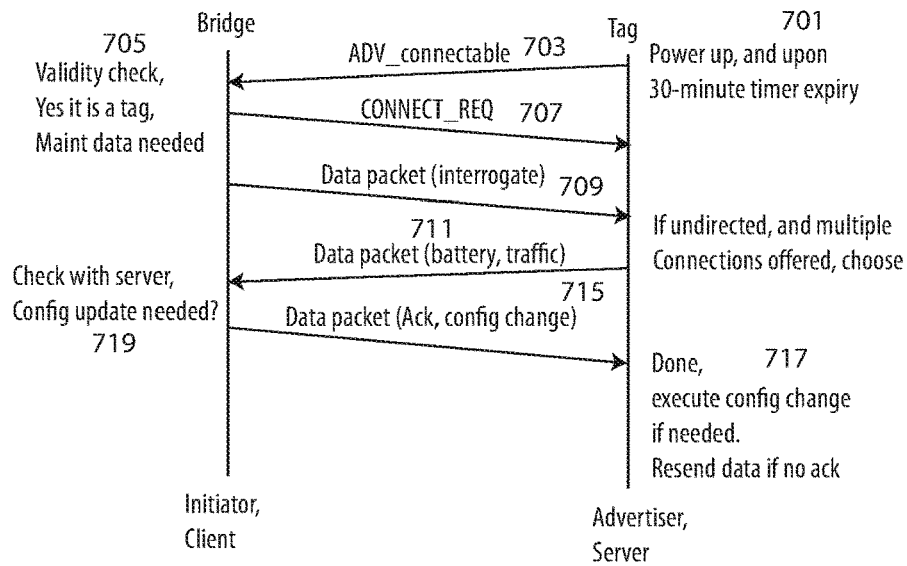
FIG. 7 is a diagram illustrating a tag initiation and maintenance connection.

FIG. 7 is a diagram illustrating a tag-initiation connection when a new tag is introduced into the RTLS system, or a periodic status-maintenance connection. The process begins 700 where the tag is powered up (and also upon expiration of a timer) 701 and will transmit a signal to the bridge that it is available for connection 703. The bridge performs a validity check 705 and if it is a valid tag and maintenance data is needed, the bridge will transmit a connection request 707 along with a data interrogation packet 709 to the beacon. If undirected and multiple connections are offered, the beacon will choose a connection and will transmit a data packet indicating its estimated location, battery strength and traffic condition to the bridge 711. The bridge will then check with the server to determine if a configuration update is needed 713. When a configuration update is needed, the bridge will then reply with a data packet acknowledging a configuration change 715. The beacon will then execute the configuration changes needed and resend data if no acknowledgment is received 717. Thereafter, the bridge will update the location server via Wi-Fi 719.

Figure 8:
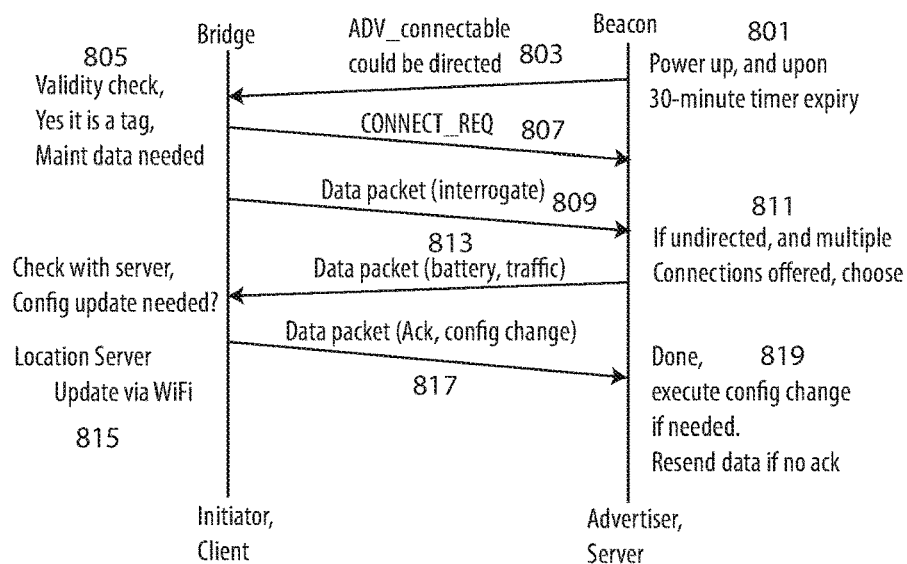
FIG. 8 is a diagram illustrating a beacon initiation and maintenance connection.

FIG. 8 is a diagram illustrating a beacon initiation/maintenance connection when a new beacon is introduced into the RTLS system. The process begins 800 where a beacon is powered up and upon a timer expiration 801, the beacon transmits a signal connect to the bridge 803. The bridge then performs a validity check to determine it is a valid beacon and if any maintenance status is required 805. The bridge then transmits a connect request 807 and a data packet interrogate 809 to the beacon. If the tag's query is undirected and multiple connections are offered, the beacon chooses a connection 811. The beacon then transmits the data packet with battery and traffic information 813 to the bridge. The bridge then checks with the location server to determine if a configuration update is needed 815. If a configuration update is needed, the bridge transmits a data packet with an instructed configuration change to the beacon. The beacon then executes the configuration change and if needed will resend data if no acknowledgment is received 819.

Figure 9:
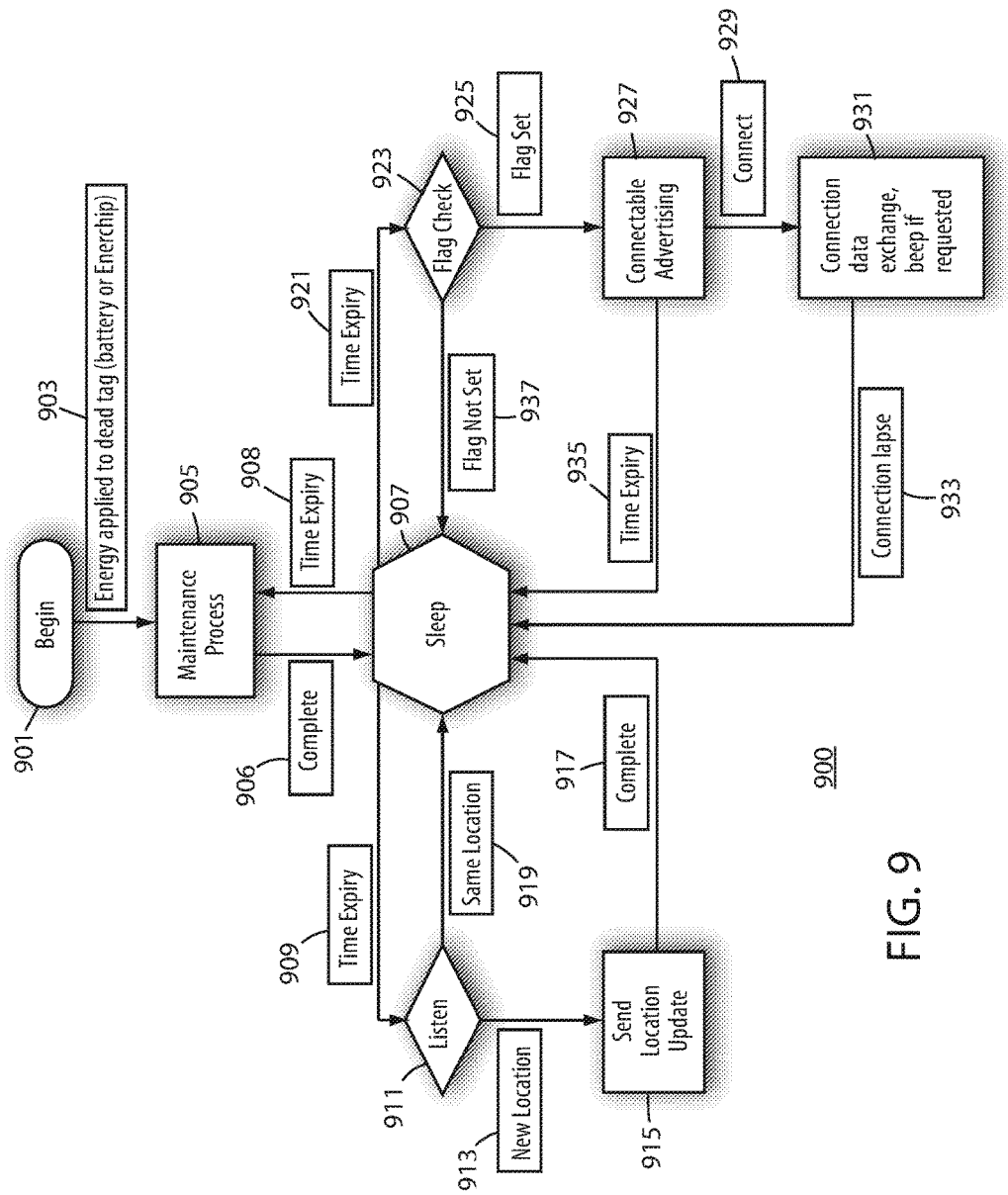
FIG. 9 is a flow chart diagram illustrating processes used by a tag in accordance with some embodiments of the invention.

FIG. 9 is a flow chart diagram illustrating processes performed by a tag in accordance with some embodiments of the invention. The processes used by the tag 900 begin 901 where energy is applied to an enacted tag either through the use of the battery or its internal capacitor 903. The tag executes a maintenance process 905 and when complete 906 will go into a sleep mode 907. At an accelerometer instruction or the expiration of a first timer 909, the tag will listen 911 to receive a beacon signal(s). If the beacon is detected and the tag's Kalman filter process estimates a new location 913 the tag will send a location update 915. When this location update is complete 917, the tag will return to a sleep mode 1107.

In situations where the tag is asleep 907, and upon expiration of a second timer 921, the tag will perform a flag check 923 to determine its flag-status in the RTLS system. If the flag has not been set 937, the tag will return to sleep mode 907. However, if a flag is set 925, the tag may sound, and connectable advertising is transmitted by the tag 927 until expiration of a third timer 935. At this time, the tag would return to a sleep mode 907. However, if a connection is made 929 by the connectable advertising 927, connection data is exchanged, and a beep is actuated if requested 931. Once this connection has lapsed 933, the tag will return to a sleep mode. Upon expiration of a fourth timer 908, the tag will periodically reenter the maintenance process 905 and return to a sleep mode 907.

Figure 10:
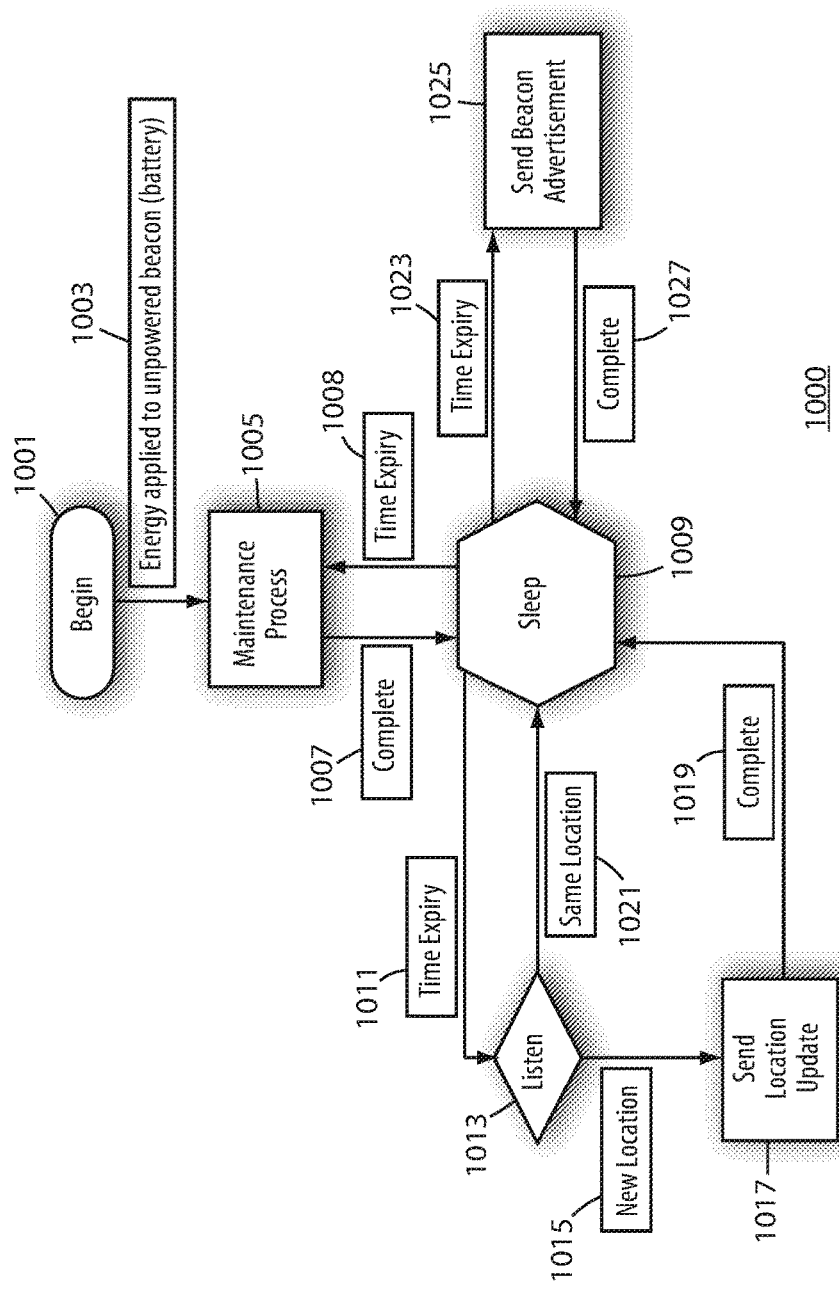
FIG. 10 is a flow chart diagram illustrating processes used by a beacon in accordance with embodiments of the invention.

FIG. 10 is a flow chart diagram illustrating processes used by the beacon in accordance with embodiments of the invention. The beacon process 1000 begins 1001 where energy is applied to an empowered beacon through its battery 1003. The beacon performs a maintenance process 1005 and once complete 1007 go into a sleep mode at 1009. Upon expiration of the first timer 1011, the beacon will listen 1013 and if a new location is estimated 1015 (that is, the beacon has moved from its initialized location because it has fallen from the ceiling or been removed), the beacon will send a location update 1017 to the bridge. When this process is complete 1019, the beacon will return to a sleep mode 1009. In instances where the same location is estimated 1021, the beacon will merely return to a sleep mode 1009. As further seen in FIG. 10, upon expiration of a second timer 1023, the beacon will send an advertisement transmission 1025 to tags in its vicinity. Once complete 1027, the beacon will return to a sleep mode 1009. Finally, when the beacon is in the sleep mode 1009 and upon expiration of a third timer 1008, the beacon will periodically run another self-diagnostic maintenance routine or process 1005 where it will then again return to the sleep mode 1009.

Figure 11:
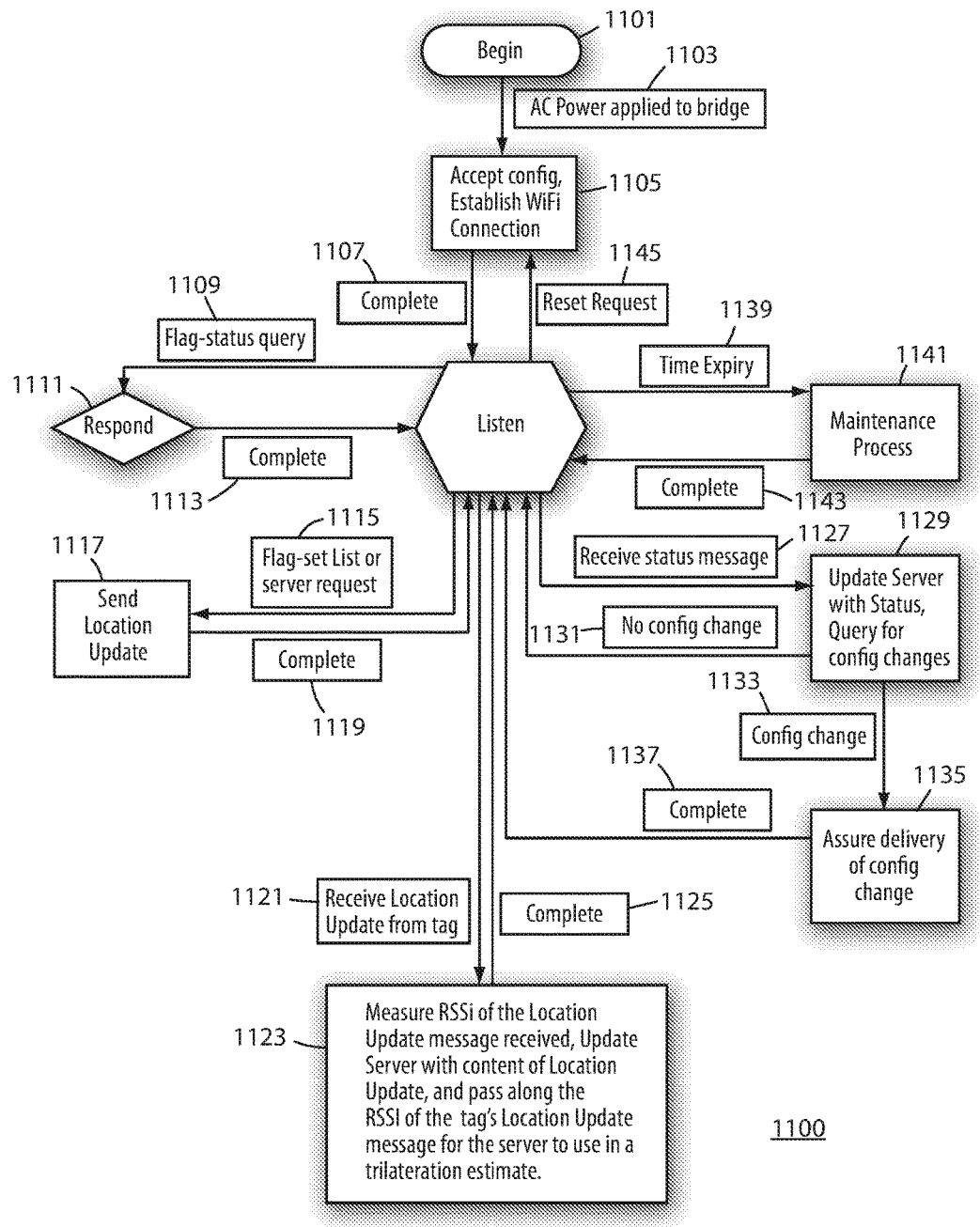
FIG. 11 is a flow chart diagram illustrating processes used by a bridge in accordance with embodiments of the invention.

FIG. 11 is a flow chart diagram illustrating processes used by the bridge in accordance with embodiments of the invention. The bridge processes 1100 begin 1101 where AC power is applied to the bridge 1103. The bridge will initiate a Wi-Fi connection 1105 and when complete 1107 will enter a listen mode 1109 to receive signals from tags or beacons. Thereafter, the bridge will periodically receive a flag status inquiry 1109 and send responses 1111 to tags in the RTLS. Once complete (or simultaneously, using multiple BLE transceivers) 1113 the bridge will again enter a listen mode 1109. The bridge will also periodically query for and/or receive an updated tag-finder flag-status list from the server 1117 in the central location. When the bridge receives a location update 1121, it will update the server with the tag location 1123. Once complete (or simultaneously, using multiple BLE transceivers) 1125, it will again enter the listen mode 1109. If the bridge receives a status message 1127 from a tag or beacon in its maintenance routine, it will update the server with the status and query the server for configuration changes 1129. If the tag or beacon has not changed its configuration 1131, the bridge will return to the listen mode 1109. However, if it does detect a configuration change 1133, it will assure delivery of the configuration changes 1135 to the tag or beacon. Once this process is complete (or simultaneously, using multiple BLE transceivers) 1137, the bridge will again reenter the listen mode 1109. Finally, the bridge may also enter a maintenance mode where upon expiration of a timer 1139, a self-diagnostic maintenance process will begin 1141 and once complete 1143 will again enter the listen mode 1309. The bridge may also initiate a reset request 1145 that will reestablish a Wi-Fi connection 1105, and once complete 1107 will reenter the listen mode 1109.

Figure 12:
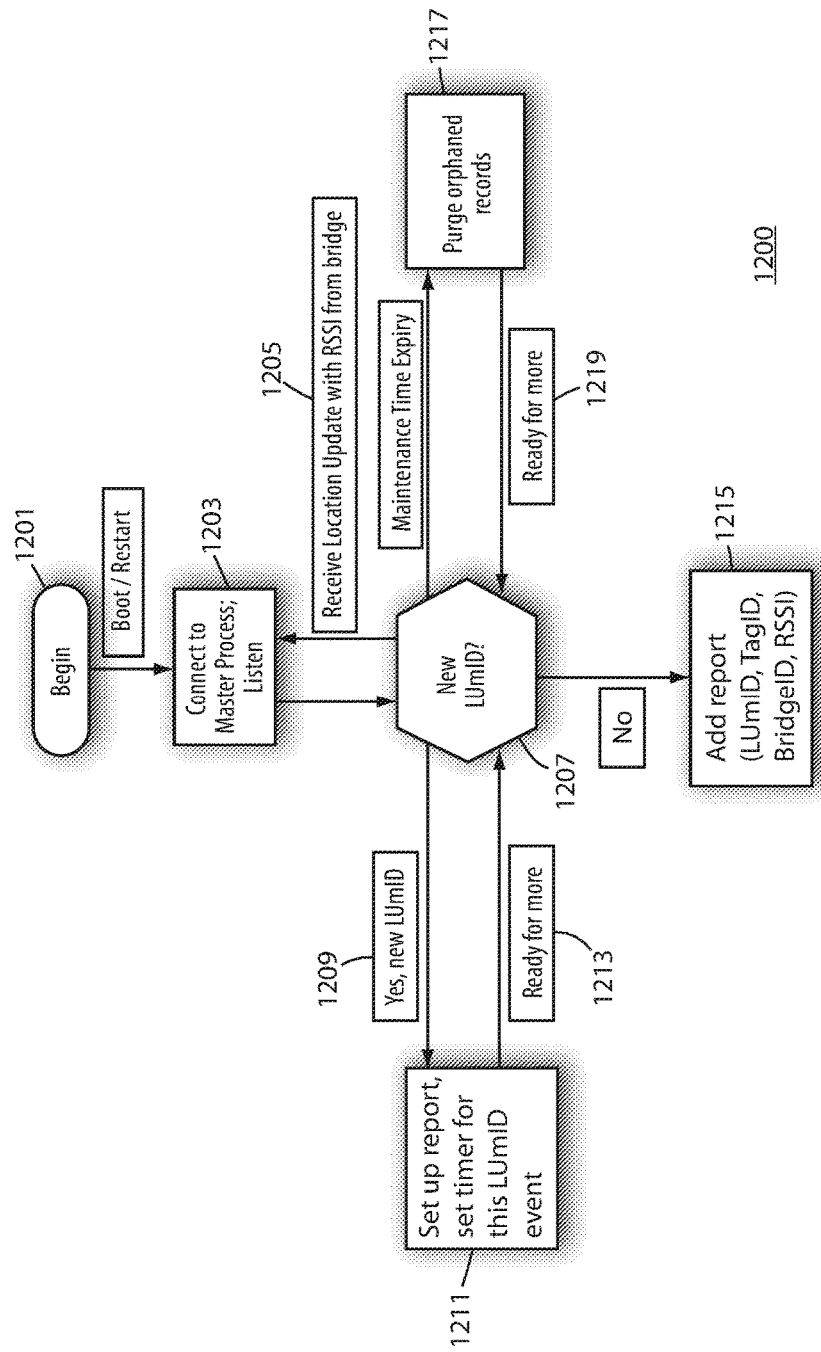
FIG. 12 is a flow chart diagram illustrating step 1 of a location engine process which combines both tag-transmitted Location Update message content (about beacons heard) and characteristics of the Location Update messages received at multiple bridges, to estimate a location fix.

FIG. 12 is a process chart showing the first portion of the location engine process 1200. Upon boot 1201, the process will listen for location update messages from bridges 1203. Each location update message contains the tag's calculated information about probabilities of closest-beacon proximity for one or more beacons (defined herein as "Information Set 1"). Each location update message contains a Location Update message ID (LUmID) that was generated and assigned by a tag when it created the Location Update message. Several bridges may send Location Updates to the location engine citing the same Location Update message ID. The location engine process receives a location update message from a bridge 1205. The location engine process examines the LUmID 1207. If the location update message contains a new LUmID 1209, the location engine process sets up a data table for the new LUmID and sets a message-collection timer 1211. The location engine process is now ready to receive more messages within the timer interval that cite the same LUmID 1213. The location engine process collects subsequent messages with repeated LUmIDs for processing 1215. The location engine process includes a routine to purge old LUmIDs when they are no longer useful 1217, so it is ready to review more messages 1219.

Figure 13:
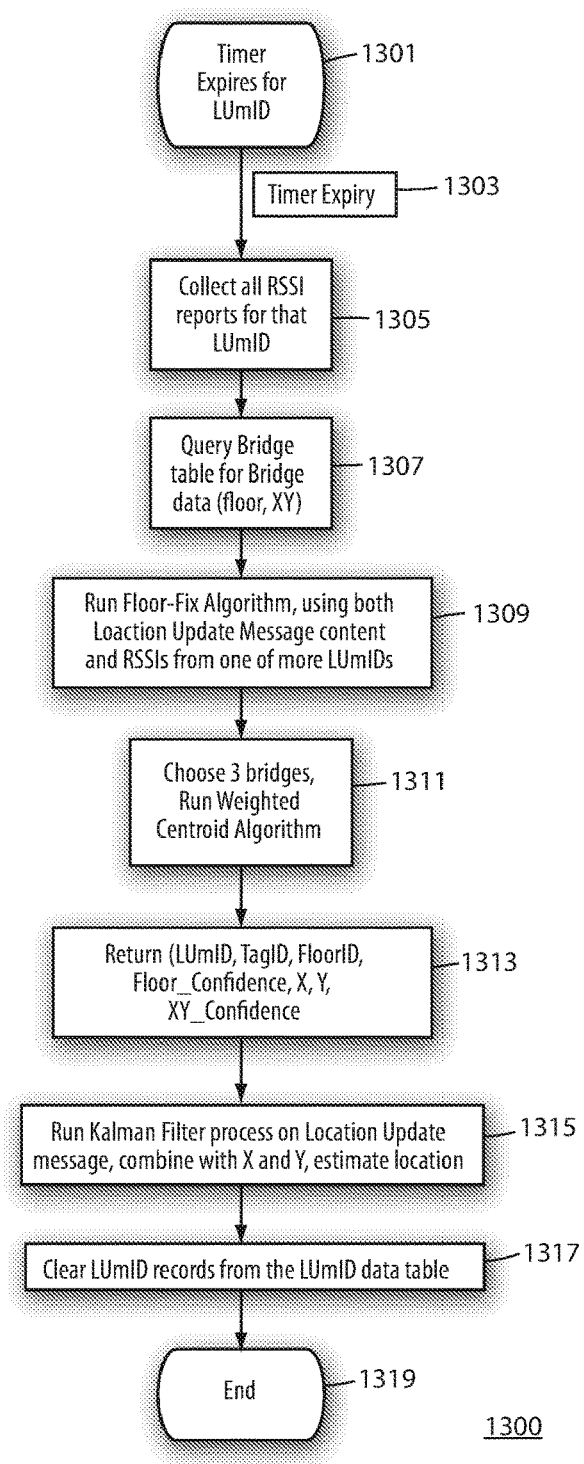
FIG. 13 is a flow chart diagram illustrating step 2 of a location engine process which combines both tag-transmitted Location Update message content (about beacons heard) and characteristics of the Location Update messages received at multiple bridges, to estimate a location fix.

FIG. 13 is a process chart showing the second portion of the location engine process 1300. The location engine process monitors a timer for each LUmID 1301. When a timer expires for a LUmID 1303, the location engine collects all RSSI information for all messages received with the LUmID 1305. The location engine process looks up the location reference information for each bridge that reported 1307. The location engine process estimates the most-likely building floor that a tag resides on 1309, combining the RSSI information from the bridges defined herein as "Information set 2" with information reported in the Location Update message (defined herein as "Information Set 1") 1309. The location engine process chooses three bridges on the most-likely floor and runs a trilateration algorithm such as a weighted centroid, to estimate the location of the tag on the floor 1311. The location engine process returns a candidate location fix for the tag 1313. The location engine process combines information from the trilateration algorithm (Information Set 2) with information from the Kalman filter process (Information Set 1) 1315 to estimate the tag's location. Finally, the location engine process clears location update records from the LUmID table 1317 and ends the location process for that Location Update Message 1319.

Thus, the present invention describes a new wireless technology available for RTLS systems in healthcare that makes the RTLS affordable for U.S. hospitals. As described herein, the present invention uses Bluetooth Low Energy (BLE) technology. Unlike RTLS systems of the last ten years, BLE-based RTLS systems are based on low-cost, standard, commoditized hardware. Essentially, hospitals will benefit from the size, scale, and standardization of BLE in the cellphone and retail industries, to dramatically reduce the cost of RTLS hardware and systems. If BLE systems provide the same financial benefits listed above, at half the cost, hospitals will double their forecasted return on an RTLS investment. It is possible that the BLE-based RTLS systems will provide additional value from additional features, relative to the RTLS systems offered today.

In utilizing embodiments of the present invention, RTLS vendors will manufacture battery-powered tags to be placed on medical equipment, staff members and patients, and then equip a hospital with bridges (which listen to tags) or location beacons (which transmit to tags) throughout the areas where assets travel. For patient and staff tracking, wristbands, tags and badges are available as well. For the first ten years of RTLS, there were few if any standards for communication between tags and sensors. The RTLS systems may work well, but the tags from one vendor do not often talk to sensors or exciters from other vendors. Each of the vendors wishing to serve hospitals employed a patented, proprietary communication system between the tags, sensors and exciters. That communication system typically used some combination of these technologies: Wi-Fi, Infrared, Ultrasound, ZigBee, or private radio networks using frequencies at 433 and 900 MHz.

For the hospital, one benefit of using a proprietary, patented RTLS system is the "single throat to choke" aspect: A single vendor is responsible for making sure the tags and infrastructure work well. But there are two significant drawbacks: 1) without standardization, a hospital is forced to purchase expansion hardware from the chosen vendor, without the benefit of competitive-market pricing; and 2) millions of dollars of cost to develop, troubleshoot and support the system has to be amortized by the purchaser. Thus, the RTLS systems of the last ten years tend to cost several hundred dollars per piece of RTLS infrastructure.

In contrast, Bluetooth Low Energy has emerged from the world of consumer-radio standards. The Bluetooth Special Interest Group (SIG) is an industry group committed to the standard implementation of the IEEE standards for low-power radios. Essentially, the millions of dollars of cost to develop, troubleshoot, and support a Bluetooth-based RTLS system will be amortized over the billions of interoperable Bluetooth/BLE devices that are being produced and launched, by hundreds of companies outside healthcare. Each piece of BLE infrastructure for healthcare RTLS is expected to cost several tens of dollars, in contrast to the several hundreds of dollars for alternate RTLS systems. Hardware pricing for a hospital's RTLS infrastructure may fall by 90% because of BLE. In addition, BLE-based standard RTLS systems already allow bridges/central devices to trilaterate any BLE-advertising device in range, allowing hospitals to track any BLE-advertiser that enters the campus, giving options to buy any manufacturer's BLE tags.

The principal component of a BLE-based system for determining a location fix is the BLE beacon. Retailers the world over are testing BLE beacons to provide location fixes for shoppers in stores. Beacons placed in every aisle of a store will emit a low-powered radio signal. Smartphones running the retailer's app will pick up the beacon signal and tell the store where the smartphone (and shopper) are located at that instant. Retailers imagine a world where their location-aware communication with the shopper via an app and BLE-equipped smartphone can enhance the shopping experience (and retailer profit). These beacons may be used by the present invention for location of tags.

In summary, BLE brings a new generation of Real-Time-Locating Systems to hospitals, which should halve their costs, and double their return, on their RTLS investment. Room-level accuracy may be improved to drawer-level, and management of accuracy problems is simplified. The standardization of BLE both drives down cost and reduces risk for hospitals. Hospitals that have deemed RTLS too expensive in the past may deploy the new generation of lower-cost RTLS equipment.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A real-time location system (RTLS) having tags, beacons, bridges, and a central location server for providing people- and asset-tag locating, comprising:
    at least one beacon for transmitting Bluetooth low energy (BLE) advertisements;
    at least one tag for listening for BLE advertisements from the beacons and measuring multiple characteristics of the received advertisements, including received signal strength, and transmitting location-update messages to bridges using BLE messaging;
    a least one bridge for receiving location-update messages from the at least one tag using the BLE radio protocol and measuring multiple characteristics of the received location-update messages, including received signal strength;
    a central location server utilizing a plurality of location-determining methods comprising:
        a first location method for calculating a first location estimate for the at least one tag, based on characteristics of BLE beacon signals emitted by at least one beacon in fixed locations and received by the at least one tag, and transmitted to the central location server;
        a second location method for calculating a second location estimate for the at least one tag, based on characteristics of BLE-standard location update messages transmitted by the at least one tag, received by a fixed infrastructure of BLE bridges, and transmitted to the central location server; and
        a third location method for combining the first and second location estimates to determine a location result for the at least one tag.

2. An RTLS as in claim 1, wherein the at least one tag comprising:
    a BLE transceiver;
    a microprocessor for operating the transceiver;
    a battery for powering the BLE transceiver and microprocessor;
    an energy-harvester (e.g., photocell) connected to an energy storage device;
    a capacitor connected to the energy storage device; and
    wherein the energy harvester charges the energy storage device so the capacitor can power the microprocessor and BLE transceiver for performing limited tasks upon battery depletion.

3. An RTLS as in claim 2, wherein the tag can transmit a location update with a dead battery.

4. An RTLS as in claim 2, wherein the at least one tag further comprising:
    an accelerometer for detecting motion used by the microprocessor for conserving the battery; and
    a speaker for providing an annunciating sound for use in tag location, such that the at least one tag toggles into and out of a battery-saving mode and a connectable-advertising mode under control from the at least one bridge.

5. An RTLS as in claim 2, wherein the at least one tag estimates its own probability of a location change using current signal strength readings, past signal strength readings, accelerometer status, and/or fast-fading characteristics of the environment, processed by a Kalman filter, and uses the probability to transmit or withhold location update information, to report location while minimizing the energy spent transmitting.

6. An RTLS as in claim 1, wherein the at least one beacon comprising:
    a BLE transceiver;
    a microprocessor for operating the transceiver;
    a battery for powering the BLE transceiver and the microprocessor; and
    at least one directional antenna for directing the RF signal from the BLE transceiver to a target area(s) within the floor and room for providing the tag with an accurate floor-level location reference or room-level location reference.

7. An RTLS as in claim 6, wherein the microprocessor executes a listening and Kalman-filter process on occasion for self-determining its own location, then transmitting a message to a bridge and server when the beacon has moved, self-reporting its movement.

8. An RTLS as in claim 6, wherein the beacon is configured to transmit a beaconing signal on a single channel, for battery conservation and assigning different beacon channels to beacons on different floors for providing floor hop mitigation.

9. An RTLS as in claim 1, wherein the at least one bridge comprising:
    a BLE transceiver;
    a Wi-Fi transceiver
    a microprocessor for operating the transceiver;
    an AC power system with some retention of energy after being unplugged.

10. An RTLS as in claim 9, wherein the microprocessor executes a listening process when unplugged for self-determining and reporting its own location changes, then transmitting a message to a server when the beacon has moved.

11. An RTLS as in claim 9, wherein the bridge receives, from a server, a list of tags that are in tag-finder mode, and uses that list to respond to tag queries of whether they are in tag-finder mode, to toggle tags into and out of a connectable advertising state, saving tag-battery life.

12. A real-time location system (RTLS) having tags, beacons, bridges, and a central location server for providing people and asset-tag locating, comprising:
    at least one beacon for transmitting Bluetooth low energy (BLE) advertisements;
    at least one tag for listening for BLE advertisements from the beacons and measuring multiple characteristics of the received advertisements, including received signal strength, and transmitting location-update messages to bridges using BLE messaging;
    at least one bridge for receiving location-update messages from the at least one tag using the BLE radio protocol and measuring multiple characteristics of the received location-update messages, including received signal strength; and a central location server;

wherein the RTLS utilizes the steps of:

reporting with low energy Bluetooth (BLE) messaging through the at least one bridge to the central location server at a central location;

periodically updating the at least one bridge with information from the central location server to determine changes in the status of the at least one tag while in a tag-finder-mode;

periodically querying from the at least one tag to the at least one bridge for changes while in the tag-finder-mode;

beaconing for connections with smart devices when in the tag-finder mode; and audibly sounding an alert upon instruction from the server or smart device.

13. An RTLS as in claim 12, wherein the at least one tag comprising:

a BLE transceiver;

a microprocessor for operating the transceiver;

a battery for powering the BLE transceiver and microprocessor;

a photocell connected to an energy storage device;

a capacitor connected to the energy storage device; and wherein the photocell charges the energy storage device so the capacitor can power the microprocessor and BLE transceiver for performing limited tasks upon battery depletion.

14. An RTLS as in claim 13, wherein the at least one tag transmits a location update when the battery reaches a predetermined voltage threshold.

15. An RTLS as in claim 13, further comprising:

an accelerometer for detecting motion used by the microprocessor to conserve energy in the battery; and a speaker for providing an annunciating sound for use in tag location, such that the tag toggles into and out of a battery-saving mode vs a connectable-advertising mode.

16. An RTLS as in claim 13, wherein the at least one tag estimates its own probability of a location change using current signal strength readings, past signal strength readings, accelerometer status, and/or fast-fading characteristics of the environment, processed by a Kalman filter, and uses the probability to transmit or withhold location update information, to report location while minimizing the energy spent transmitting.

17. An RTLS as in claim 12, wherein the at least one beacon comprising:

a BLE transceiver;

a microprocessor for operating the transceiver;

a battery for powering the BLE transceiver and the microprocessor; and at least one directional antenna for directing the RF signal from the BLE transceiver to a target area within the floor and room for providing the tag with an accurate floor-level location reference or room-level location reference.

18. An RTLS as in claim 17, wherein the microprocessor executes a listening and Kalman-filter process on occasion for self-determining its own location, then transmitting a message to the at least one bridge and the central location server when the beacon has moved its location.

19. An RTLS system as in claim 17, wherein the at least one beacon is configured to transmit a beaconing signal on a single channel, for battery conservation and to mitigate floor-hop mitigation by assigning different beacon channels to beacons on different floors.

20. A method for configuring a real-time locating system (RTLS) using at least one radio frequency (RF) tag comprising the steps of:

setting the at least one tag in a sleep mode until an accelerometer senses significant motion of the at least one tag;

accepting multiple Bluetooth low energy (BLE) advertisements at the at least one tag;

measuring the signal strengths of the BLE signals;

determining whether those signal strength measurements dictate an estimated change of tag location, utilizing a Kalman filter process using fast-fading mitigation and tag-resident calculation processes;

calculating a confidence metric based on a signal strength measurement; and using the confidence metric to provide the operator of the RTLS a textual message suggesting helpful information in addition to the estimated location of the tag.

* * * * *